J. MOREAU
METHOD OF SOLDERING.
APPLICATION FILED APR. 15, 1921.
1,426,311.
Patented Aug. 15, 1922.
2 SHEETS—SHEET 1.
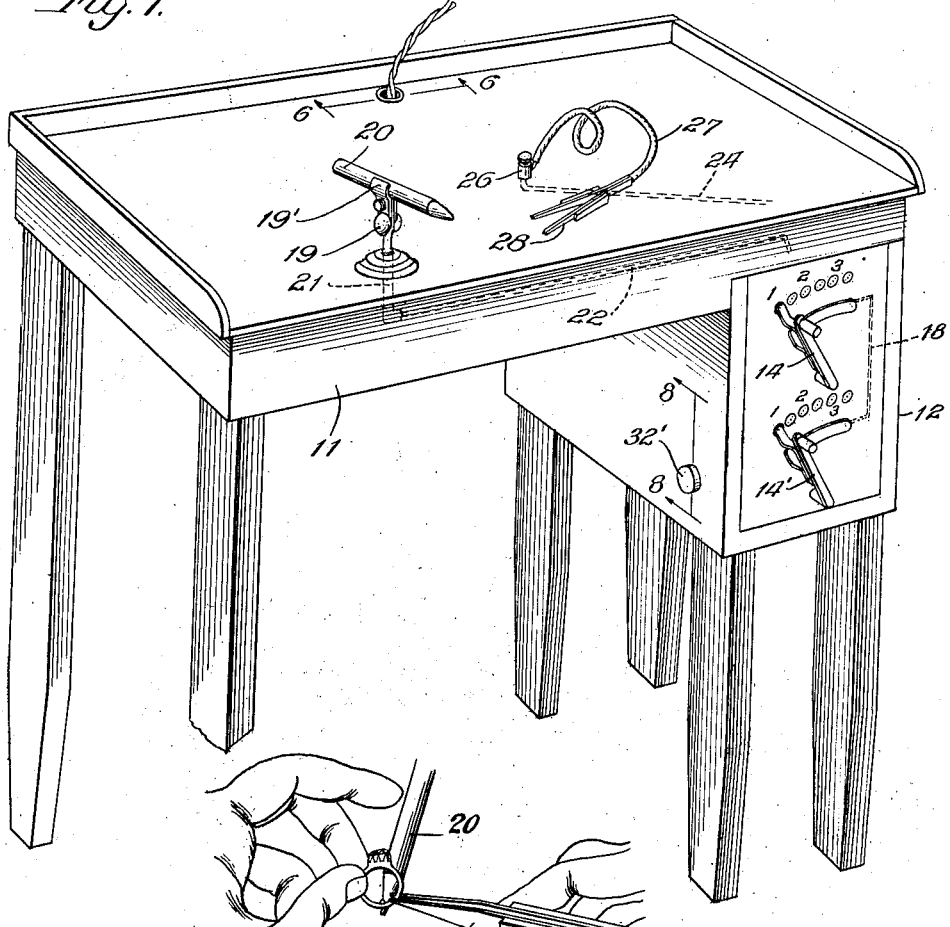
Fig. 1.
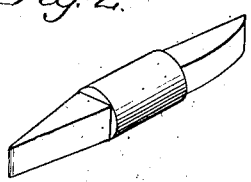
Fig. 2.
Fig. 3.
Fig. 4.
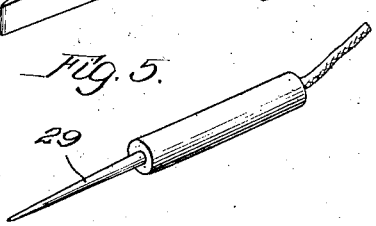
Fig. 5.
Fig. 11.
Inventor:
Joseph Moreau
By Wm O Bell
Atty.

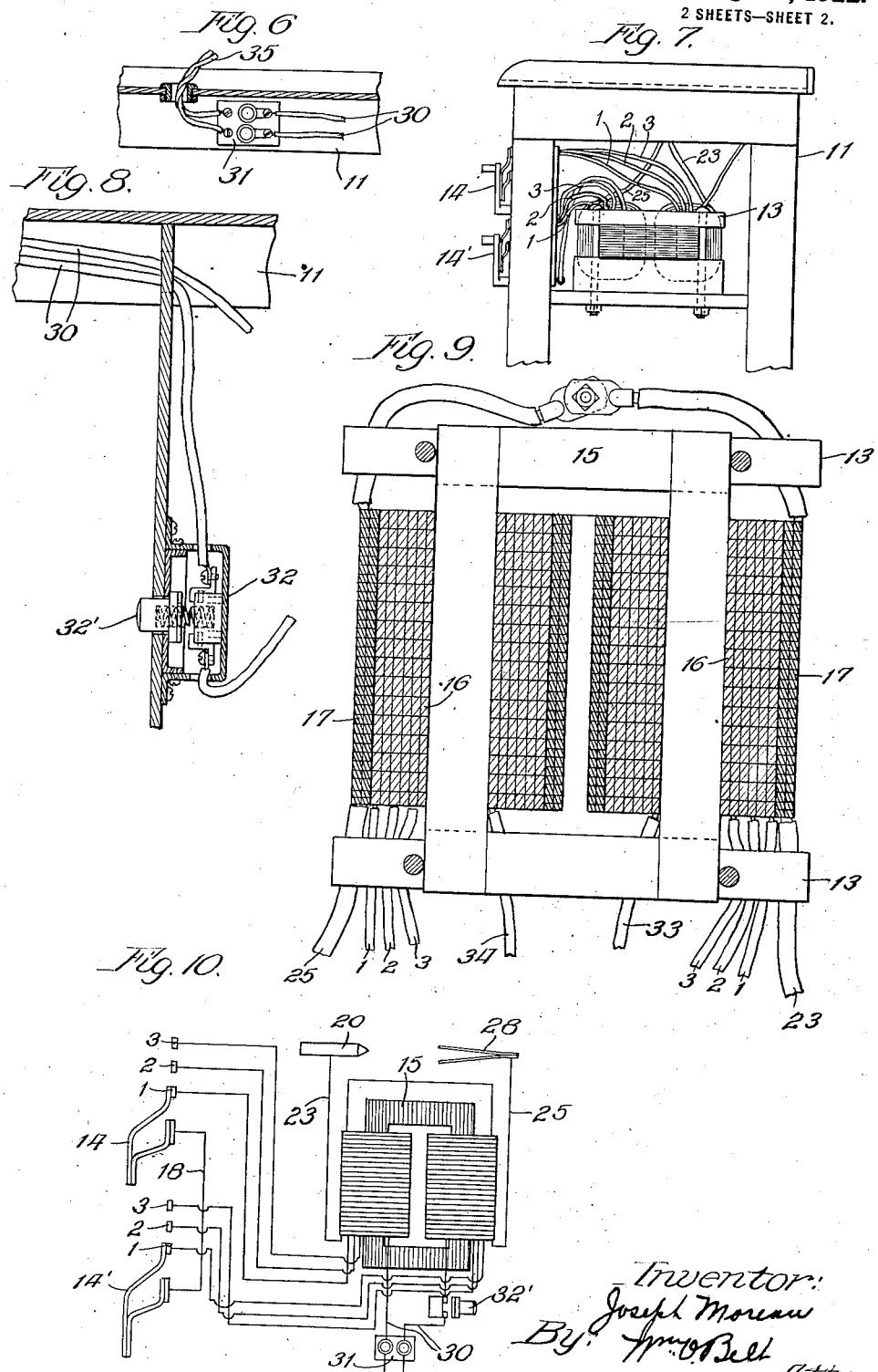

UNITED STATES PATENT OFFICE.

JOSEPH MOREAU, OF CHICAGO, ILLINOIS, ASSIGNOR TO PERRY N. NELSON, OF CHICAGO, ILLINOIS.

METHOD OF SOLDERING.

1,426,311.   Specification of Letters Patent.   Patented Aug. 15, 1922.

Application filed April 15, 1921. Serial No. 461,672.

*To all whom it may concern:*

Be it known that I, JOSEPH MOREAU, a citizen of the United States, residing at Chicago, in the county of Cook and State of Illinois, have invented certain new and useful Improvements in Methods of Soldering, of which the following is a specification.

It has been common practice, so far as I am aware, for jewelers to use a blow torch in repairing rings and other articles of jewelry. This method is objectionable for many reasons and particularly because the heat is spread over a much greater area than is necessary for the actual soldering operation. This often makes it necessary to remove settings to prevent damage thereto and the greatest care must be exercised and various expedients are often resorted to in an effort to protect settings and enamel work. When the article is ornamented with fretwork the danger of damage thereto by the use of an ordinary torch is so great that most jewelers are reluctant to attempt repairing.

The object of my invention is to provide an improved method for use by any jeweler for soldering and which can be used to solder any article of jewelry without damage to any part thereof.

A further and more particular object of the invention is to enable a jeweler to repair by soldering articles of jewelry which contain settings, enamel work or are ornamented with fretwork and delicate engraving without necessitating any special treatment and with assurance that no damage will result from the operation.

The invention also aims to provide a method for universal use in soldering gold, silver, platinum and any other metal used in jewelry and using for the purpose solder of the same karat as the article itself.

And a further object of the invention is to enable the operator to perform his work quickly and without danger of being burned by unnecessary spreading of the heat; and a still further object of the invention is to provide an even, concentrated heat under perfect control of the operator to insure an even flow of the solder.

In the accompanying drawings I have shown a selected embodiment of an apparatus for practicing my invention, and referring thereto—

Fig. 1 is a perspective view of one type of jeweler's bench equipped with means for practicing my invention.

Figs. 2, 3 and 4 show various forms of carbon electrodes.

Fig. 5 shows one form of the copper electrode.

Fig. 6 is a sectional view on the line 6—6 of Fig. 1 illustrating the fuse block.

Fig. 7 is an end view of the bench showing the transformer and adjustment switches.

Fig. 8 is a sectional view showing the knee switch.

Fig. 9 is a sectional view of the transformer.

Fig. 10 is a diagrammatical view of the circuit.

Figure 11 is a detailed view illustrating the use of the apparatus in carrying out my method for soldering the joint of a finger ring.

In the drawings, there has been shown a bench 11 of any suitable shape and size which is preferably provided at one end with a cabinet 12 to house the transformer 13 and support the adjustment switches 14—14.

The transformer is more particularly described in my companion application filed concurrently herewith and comprises a rectangular two leg core 15 having a primary winding 16 of six layers and 258 turns of number 11 D. C. C. wire on each leg and a secondary winding 17 of one layer and 5 turns of 100,000 circular mill conductor D. C. C. on each leg. The taps 3, 2, and 1 of the primary winding on one leg are connected to corresponding points on one switch, as 14, and the taps 3, 2, and 1 of the primary winding on the other leg are connected to corresponding points on the other switch as 14' and these switches are connected by a wire 18 to complete the circuit between selected layers of the primary.

An adjustable clamp 19 of any suitable form is preferably mounted in fixed position on the bench and is adapted to hold a carbon electrode 20. The clamping members 19' of the clamp are preferably made of copper and are connected electrically with a copper stem 21 which projects down through the bench and is connected by a wire 22 with the secondary lead 23 on the transformer. A wire 24 is connected to the secondary lead 25 and to a binding post 26 on the bench and a flexible wire 27 is also connected to this binding post and carries at its outer end a copper electrode which may be in any suitable form such as the tweezers 28 or the point 29.

The carbon electrode may also be in any suitable form and I have shown several different forms in the drawings any one of which will be suitable for certain work. It may be desirable to provide a round surface or a flat surface or an edge to concentrate the heat at the particular spot where the joint is to be made and to more conveniently reach places difficult of access.

The input leads 30 are connected in circuit from the fuse box 31 through the knee switch 32 to leads 33 and 34 on the transformer. The spring pressed button 32' of the knee switch projects through the cabinet 12 of the bench in a convenient position for operation by the operator to close the primary circuit. The apparatus is designed to be connected by a flexible extension cord to any convenient lighting outlet. The input on the transformer is designed to work under its heaviest load on 650 watts, keeping within the underwriters' allowance for this on ordinary electric light circuits.

My invention provides a simple method whereby a jeweler can solder articles of jewelry without injury thereto and especially without damaging settings, enamel or fretwork. This is made possible because a very quick heat of sufficient intensity is provided directly at the point of contact which enables the soldering operation to be completed before the heat has travelled far from the point of contact. For example, reference being made to Figure 11, a soldered joint can be made in the shank of a ring A having a jeweled setting or enamel work by grasping the top of the ring in one hand, depositing sufficient solder on the ring where the joint is to be made and engaging the ring at that point with the carbon electrode 20 and then completing the circuit by engaging the other electrode 29 with the ring adjacent to the solder. Sufficient heat will be quickly produced at the point of contact to flow the solder and complete the operation before the heat has travelled through the ring to the setting and hence the ring can be conveniently held in the fingers and without injuring the setting or heating the top of the ring to the point of damage. Because a sufficient heat can be produced at the point of contact only and the soldering operation completed very quickly it is possible with my invention to do soldering work on articles of jewelry without injury thereto and without the necessity of such precautionary measures as have been customary heretofore. It will be understood that the degree of heat can be regulated by adjusting the switches 14 and 14' and I prefer to use the transformer herein described and more particularly set forth in my companion application for providing a proper current of comparatively low voltage and high amperage at the point of contact, for I have found this transformer to be particularly well suited for the purpose, but in the broad aspect of my invention any other means for accomplishing the same or equivalent results may be employed instead of this transformer.

I prefer to use a high resistance carbon for the electrode 20 because it will instantly produce an incandescent heat at the point of contact with a conductor of low resistance. The heat is controlled by the adjustment switches so that a proper degree of heat will be provided for different classes of work.

I have found by practical use of the invention that it enables comparatively inexperienced persons to do soldering work on articles of jewelry which has heretofore only been possible to persons highly skilled in the use of a blow torch, and that this work can be quickly done at a great saving in time and material and that it will enable jewelers to do much soldering work which they have heretofore been unable to do.

I claim:

1. The herein described method of uniting the ends of a work-piece to form a continuous element, which consists in depositing solder on the work-piece where the joint is to be made, engaging the work-piece at that point with a high resistance electrode, and completing the circuit by engaging a low resistance electrode with the work-piece adjacent the solder, whereby heating of the work-piece is localized at the joint.

2. The herein described method of uniting the ends of a work piece to form a continuous element which consists in bridging the joint of the work-piece with solder, applying an electrode of high resistance and small contact area to the work-piece at the joint, applying an electrode of low resistance and large contact area to the work-piece adjacent to the joint, and passing an electric current from one electrode to the other whereby heating of the work-piece is localized at the joint.

3. The herein described method of uniting the ends of a work-piece to form a continuous element, which consists in holding the work-piece between its ends, bridging the joint of the work-piece with solder, applying an electrode of high resistance and small contact area to the work-piece at the joint, applying a contact of low resistance and large contact area to the work-piece adjacent to the joint, and passing an electric current from one electrode to the other whereby heating of the work-piece is localized at the joint.

4. The herein described method of soldering a joint in a finger ring, bracelet or analogous article of jewelry which consists in supporting the article opposite to the joint, bridging the joint with solder, applying an electrode of high resistance to the article at the joint, applying an electrode of low resistance to the article adjacent to the joint, and passing an electric current from one electrode to the other, whereby heating of the article is localized at the joint.

JOSEPH MOREAU.